(12) United States Patent
Alshehri et al.

(10) Patent No.: US 12,152,811 B1
(45) Date of Patent: *Nov. 26, 2024

(54) LIQUID CHILLER AND ABSORPTION REFRIGERATOR SYSTEM

(71) Applicant: KING FAHD UNIVERSITY OF PETROLEUM AND MINERALS, Dhahran (SA)

(72) Inventors: Ali Mohammad Alshehri, Dhahran (SA); Obaidallah Mohammad Munteshari, Dhahran (SA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 0 days.

This patent is subject to a terminal disclaimer.

(21) Appl. No.: 18/776,321

(22) Filed: Jul. 18, 2024

Related U.S. Application Data

(63) Continuation of application No. 17/868,331, filed on Jul. 19, 2022, now Pat. No. 12,092,376.

(51) Int. Cl.
| | | |
|---|---|---|
| F25B 15/00 | (2006.01) | |
| F25B 15/06 | (2006.01) | |
| F25B 49/04 | (2006.01) | |

(52) U.S. Cl.
CPC .......... F25B 15/008 (2013.01); F25B 15/06 (2013.01); F25B 49/043 (2013.01)

(58) Field of Classification Search
CPC ....... F25B 15/008; F25B 15/06; F25B 49/043
See application file for complete search history.

(56) References Cited

U.S. PATENT DOCUMENTS

| | | |
|---|---|---|
| 3,154,930 A | 11/1964 | Aronson |
| 3,287,928 A | 11/1966 | Reid, Jr. |
| 4,269,034 A | 5/1981 | Rzechula |

(Continued)

FOREIGN PATENT DOCUMENTS

| | | | |
|---|---|---|---|
| CN | 112747494 B | * 6/2024 | .............. F25B 15/06 |
| GB | 909022 | 10/1962 | |

(Continued)

OTHER PUBLICATIONS

Bell, et al. ; The design of an evaporator/absorber and thermodynamic analysis of a vapor absorption chiller driven by solar energy; Renewable Energy, vol. 9, Issues 1-4; pp. 657-660; Sep.-Dec. 1996; Abstract Only; 1 Page.

*Primary Examiner* — Miguel A Diaz
*Assistant Examiner* — Ibrahim A. Michael Adeniji
(74) *Attorney, Agent, or Firm* — Oblon, McClelland, Maier & Neustadt, L.L.P.

(57) ABSTRACT

An absorption chiller refrigerator system with an evaporator-absorber section and a generator-condenser section disposed together within a housing. The evaporator-absorber system has an evaporator section having an evaporator and an absorber disposed together within the evaporator section but separated by a perforated plate within the evaporator section. The generator condenser system has a generator section having a generator and a condenser disposed together within the generator section but separated by a perforated plate within the generator section. Perforations in the perforated plate of each of the evaporator section and the generator section are cone-shaped passages.

19 Claims, 2 Drawing Sheets

(56) References Cited

U.S. PATENT DOCUMENTS

| | | | |
|---|---|---|---|
| 4,655,053 | A | 4/1987 | Kunugi |
| 5,463,880 | A | 11/1995 | Nishina |
| 6,357,254 | B1 | 3/2002 | Xia |
| 6,694,772 | B2 | 2/2004 | Inoue et al. |
| 11,470,748 | B1 | 10/2022 | Inam |
| 2003/0029188 | A1 | 2/2003 | Inoue |
| 2003/0167790 | A1 | 9/2003 | Koike |
| 2004/0177645 | A1 | 9/2004 | Zhang |
| 2006/0196222 | A1 | 9/2006 | Aoyama |
| 2008/0149311 | A1 | 6/2008 | Liu |
| 2008/0196444 | A1 | 8/2008 | Lawes |
| 2011/0283736 | A1 | 11/2011 | Manabe |
| 2015/0153077 | A1 | 6/2015 | Wyttenbach |
| 2019/0360728 | A1 | 11/2019 | Hatoya |
| 2020/0064085 | A1 | 2/2020 | Girardi |
| 2021/0130669 | A1 | 5/2021 | Raychaudhuri |
| 2021/0207856 | A1 | 7/2021 | Lundsgaard |
| 2021/0404712 | A1 | 12/2021 | Wu |
| 2023/0069597 | A1 | 3/2023 | Wu |
| 2024/0210073 | A1 * | 6/2024 | Sun ....................... F25B 15/006 |

FOREIGN PATENT DOCUMENTS

| | | |
|---|---|---|
| JP | 09-280692 A | 10/1997 |
| JP | 2008-095976 A | 4/2008 |
| WO | 2006/018216 A1 | 2/2006 |
| WO | 2022/224554 A1 | 10/2022 |

\* cited by examiner

LIQUID CHILLER AND ABSORPTION REFRIGERATOR SYSTEM

CROSS-REFERENCE TO RELATED APPLICATIONS

The present application is a Continuation of U.S. application Ser. No. 17/868,331, now allowed, having a filing date of Jul. 19, 2022.

BACKGROUND

Technical Field

The present disclosure relates to an absorption type liquid chiller and systems utilizing absorption type liquid chiller in combination with an evaporator for purposes of providing refrigeration. In particular, the present disclosure relates to a compact absorption chiller refrigerator system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Absorption chillers are machines that, by use of chemical properties, reactions and pressure differentials caused thereby, provide a cooling effect that is typically employed to chill a liquid, such as water. Absorption chillers are to be distinguished from "electric chillers" which likewise produce chilled liquid but employ a compressor and a vapor compression process for purposes of chilling the liquid. The chilled liquid, in the case of both absorption and electric chillers, is most often used in the air conditioning of buildings or in manufacturing or industrial process applications.

An absorption chiller refrigeration system is an energy-efficient air conditioning system. It is advantageous over vapor compression technology because it does not require a compressor, which is an energy-consuming device. The combination of absorption chiller refrigeration with waste heat or solar energy may be particularly effective. Typically, an absorber component of the absorption chiller refrigerator is a source of inefficiency causing a lower coefficient of performance (COP) that prohibits is adoption in an environment-friendly and non-intensive energy manner in comparison with conventional vapor compression technology. Additionally, replacing a compressor in the vapor compression technology with an absorber-generator-pump combination occupies a large footprint. Furthermore, conventional absorption chiller refrigerators employ heat exchangers in form of tube banks, flat plates, and the like. These components further add to the large footprint.

Different designs have been used to arrange the different components of absorption chiller refrigerators to achieve a reduced footprint.

WO2006018216A1 discloses an absorption-type refrigerating machine containing an evaporator provided in the form of a heat exchanger, which is connected to an air-conditioning cold water circuit and which serves to evaporate a refrigerant at low pressure; an absorber for absorbing the refrigerant vapor, which is produced in the evaporator, by means of a solvent containing a low content of refrigerant at a low pressure and housed in a same housing as the evaporator; a generator, through which hot water flows and which serves to evaporate the refrigerant out of the solvent; and a condenser, which serves to liquefy the refrigerant vapor at a higher pressure and which is provided in the form of a heat exchanger housed in a same housing as the generator. The generator is designed in such a manner that refrigerant collects in a first area at the bottom of the housing, and means are provided for thermally insulating this area from an area in which the refrigerant liquefied in the condenser collects.

U.S. Pat. No. 6,357,254B1 discloses an absorption chiller that includes a vertically split absorber section, an upper portion of which is a high temperature absorber and a lower portion of which is a low temperature absorber. A weak solution is pumped in parallel from the vertically split absorber section to a low temperature generator and a high temperature generator. The low temperature generator is disposed vertically above the high temperature generator. A concentrated solution is allowed to flow, in parallel, from the low temperature generator to the low temperature absorber and from the high temperature generator to the high temperature absorber. The flow of the concentrated solution from the low temperature generator to the low temperature absorber is a result of the elevation of the low temperature generator above the low temperature absorber while the flow of the concentrated solution from the high temperature generator to the vertically elevated high temperature absorber is a result of the pressure differential between the high temperature generator and the high temperature absorber. However, the absorption chiller of U.S. Pat. No. 6,357,254B1 also includes utilization of tube banks and heat exchangers for operation thereof, which impacts the footprint of the absorption chiller.

U.S. Pat. No. 4,269,034A discloses an absorption refrigeration system responsive to variant load demands, which provides a conventional absorption unit and a control system that adjusts the operation of the absorption unit according to the load demand. The absorption unit has an evaporator-absorber section where refrigerant is flash cooled in a near vacuum and an absorbent solution absorbs the refrigerant vapor; a generator-condenser section where the solution diluted with refrigerant is heated, thereby vaporizing the refrigerant to be condensed and returned to the evaporator; a condenser fluid supply which supplies condenser fluid to the absorber and condenser for heat transfer and carries away heat dissipated therein; a heat source supply which heats the solution in the generator; and a chilled fluid supply which supplies a chilled fluid to the evaporator for the flash cooling heat transfer and carries the cooled chilled fluid to fan coil units for refrigeration purposes. The control system has temperature sensitive probes which monitor the temperature of the chilled fluid entering and leaving the evaporator and provide signals accordingly; a differential temperature controller which receives the probe signals, compares the signals against each other and against predetermined design specifications for the absorption unit, and provides a resultant signal dependent upon the comparisons; and flow control valves which receive the resultant signal and regulate the flow of the condenser fluid, the chilled fluid, and the heating medium. Additional flow control valves responsive to the resultant signal for regulating the flow of solution to the generator and refrigerant to the evaporator are provided. However, the absorption chiller disclosed in U.S. Pat. No. 4,269,034A also includes tube banks, heat exchangers, jet sprayers, and the like for operation, which impacts the footprint of the absorption refrigeration system.

Each of the aforementioned absorption refrigerators suffers from one or more drawbacks hindering their adoption. Accordingly, it is one object of the present disclosure to provide absorption chiller refrigerator system that has a compact configuration and an improved performance in light of the conventional systems.

SUMMARY

In an exemplary embodiment, the present disclosure relates to an absorption chiller refrigerator system. The absorption chiller refrigerator system includes an evaporator-absorber section and a generator-condenser section. The evaporator-absorber section includes an evaporator section with an evaporator and an absorber, where the evaporator and the absorber are disposed together within the evaporator section. The evaporator and the absorber are separated by a perforated plate within the evaporator section, and perforations in the perforated plate of the evaporator section are cone-shaped passages. The generator-condenser section includes a generator section with a generator and a condenser, where the generator and the condenser are disposed together within the generator section. The generator and the condenser are separated by a perforated plate within the generator section, and perforations in the perforated plate of the generator section are cone-shaped passages.

In some embodiments, a first refrigerant is evaporated by the evaporator within the evaporator-absorber section to form a first refrigerant vapor.

In some embodiments, a second refrigerant is evaporated by the generator within the generator-condenser section to form a strong desiccant mixture.

In some embodiments, the perforated plate in the evaporator section is configured to jet the first refrigerant from an evaporator side of the first perforated plate into an absorbent mixture on an absorber side of the first perforated plate to form a vapor absorbed desiccant mixture.

In some embodiments, the second perforated plate is configured to jet the second refrigerant vapor from a generator side of the first perforated plate into the condenser side of the second perforated plate to form a second desiccant mixture.

In some embodiments, the absorber is configured to cool the vapor absorbed desiccant mixture and form a liquid and flow the liquid from the evaporator section.

In some embodiments, the condenser is configured to cool the second desiccant mixture and form a liquid and flow the liquid from the generator section.

In some embodiments, the evaporator is an electrical heater.

In some embodiments, a tank is fixedly attached to the evaporator to collect the liquid.

In some embodiments, the generator is an electrical heater.

In some embodiments, a tank is fixedly attached to the generator to collect the liquid.

In some embodiments, the evaporator is in liquid flow communication with condenser to recycle the weak desiccant mixture from the condenser to the evaporator by a first pump.

In some embodiments, the absorber is in liquid flow communication with the generator to recycle the strong desiccant mixture from the absorber to the generator by a second pump.

In some embodiments, the evaporator is in liquid flow communication with condenser to recycle the first refrigerant vapor from the condenser to the evaporator by a first pump.

In some embodiments, the absorber is in liquid communication with the generator to recycle the second refrigerant from the absorber to the generator by a second pump.

In some embodiments, the evaporator is in fluid communication with the absorber through circulated heated water, which heats the evaporator.

In some embodiments, the generator is in fluid communication with the condenser through circulated heated water, which heats the generator.

In some embodiments, the absorber is in fluid communication with the evaporator through circulated chilled water, which cools the absorber.

In some embodiments, the condenser is in fluid communication with the generator through circulated chilled water, which cools the condenser.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
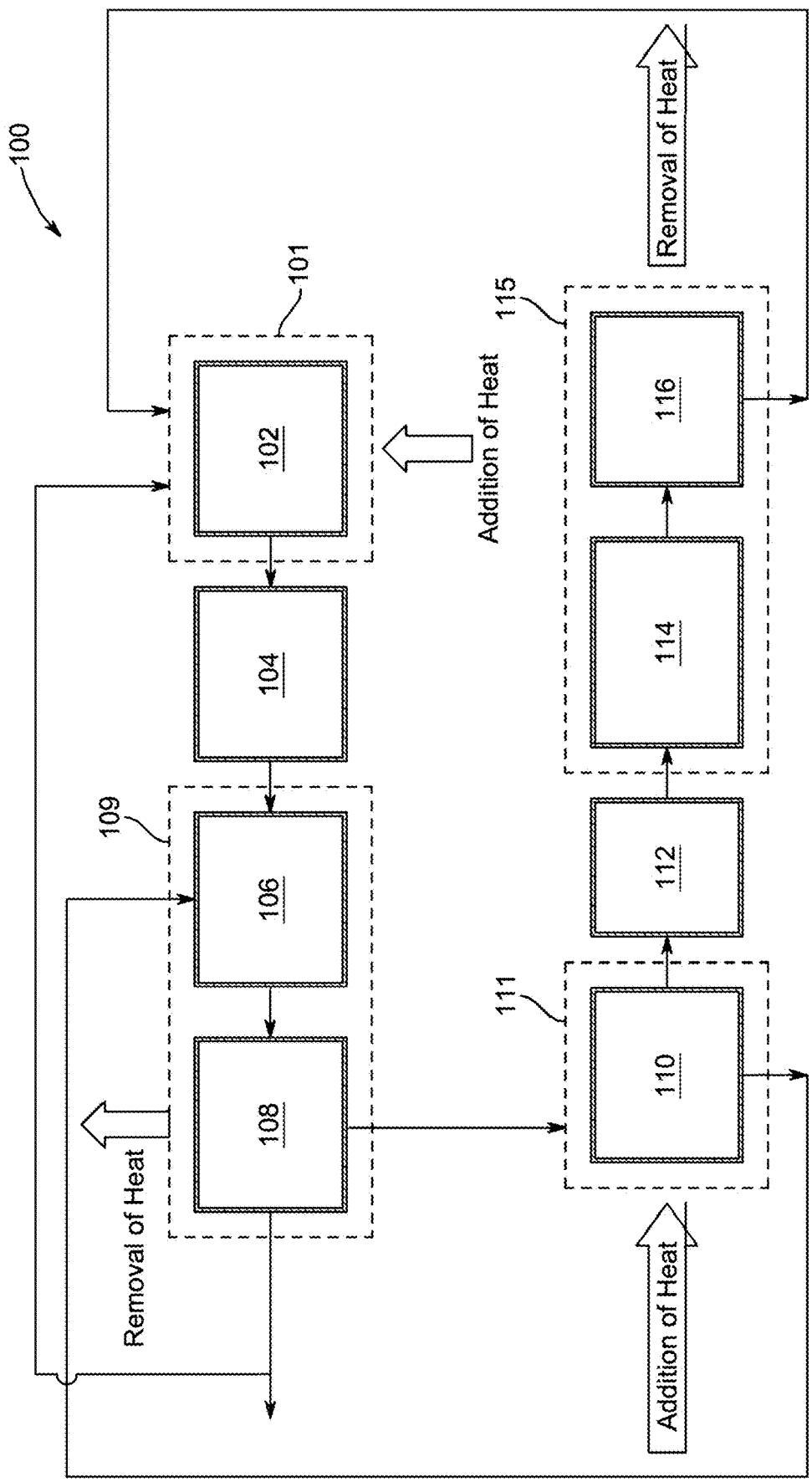
FIG. 1 is an exemplary block diagram depicting operation of an absorption chiller refrigerator system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

The present disclosure relates to an absorption chiller refrigerator system including an evaporator-absorber section and a generator-condenser section disposed together within a housing that protect the entire system from an external atmosphere. The evaporator-absorber section includes an evaporator section with an evaporator and an absorber disposed together therein but separated therefrom by a perforated plate within the evaporator section. The evaporator and absorber are disposed together within a second housing that separates the evaporator-absorber section from the generator-condenser section. Preferably the evaporator is in direct fluid (e.g., vapor) communication with the absorber only through the perforations of the perforated plate. The generator-condenser section includes a generator section with a generator and a condenser disposed together therein but separated by a perforated plate within the generator section. The generator and condenser are disposed together within a third housing that protects the generator-condenser section from the evaporator-absorber section. Particularly, the absorption chiller refrigerator of the present disclosure includes a compact generator/condenser design and absorber design that reduces size besides improving condenser efficiency and absorption efficiency, respectively.

Referring to FIG. 1, an exemplary block diagram is provided to depict operation of an absorption chiller refrigerator system (hereinafter referred to as "the system 100"), according to an embodiment of the present disclosure. At block 102, a liquid refrigerant introduced into an evaporator section 101 is vaporized by addition of heat into the evaporator section 101, thereby forming refrigerant vapor. In some embodiments, the liquid refrigerant is a hydrofluorocarbon, ammonia, water, carbon dioxide, hydrocarbons, or the like. At block 104, the refrigerant vapor is directed to enter an evaporator section to form refrigerant vapor jets/microjets. The term "jets" or "microjets", as used herein, refers to a flow of fluid that is projected into a surrounding medium, through a nozzle, aperture, or orifice, where the surrounding medium is at ambient conditions. In some embodiments, the first unit may include a perforated plate through which the refrigerant vapor is directed. The term "perforation", as used herein, refers to a hole, slit, aperture, or other opening that allows fluid to flow through or into something else. In some embodiments, the refrigerant vapor is directed to enter the first unit based off a pressure differential or elevation difference. At block 106, a strong desiccant solution is introduced, and the refrigerant vapor jets are directed to impinge on the strong desiccant solution. The term "impinge," as used herein, refers to the slowing down of a rapid fluid flow into a slower body of fluid, thereby reducing the magnitude of flow or other mechanical properties of the rapid fluid flow. The strong desiccant solution is cooled while being impinged by the refrigerant vapor jets. In some embodiments, the strong desiccant solution contains high amounts of silica gel, activated charcoal, calcium chloride, charcoal sulfate, activated alumina, clay, or the like. At block 108, the strong desiccant solution absorbs the refrigerant vapor and forms a weak desiccant solution. In some aspects, the weak desiccant solution is collected for later use or recycled back to the evaporator section, such as by a tank, container, bag, or the like. In some embodiments, the weak desiccant solution is recycled between 5 and 50 times without need for disposal, preferably 10 to 45 times, preferably 15 to 40 times, preferably 20 to 35 times, preferably 25 to 30 times, or 27 times. Since such absorption is exothermic, heat is removed from an absorber section 109 by known mechanisms to allow continuous absorption such as circulating chilled water through the absorber section 109, glycol-cooling systems, or air-cooled systems. The strong desiccant solution may not absorb all the refrigerant vapor from the refrigerant vapor jets, but between 60% and 95% by volume of the refrigerant vapor, preferably 65% to 85%, preferably 70% or 80%, or 75%. In some embodiments, the strong desiccant solution is introduced to the absorber section 109 through a funnel-like tube that is welded, screwed, or otherwise fixedly attached to the absorber section 109. As such, unabsorbed refrigerant vapor may be collected for subsequent use or recycled. In some aspects, the absorber section 109 may be cooled to aid the heat removal therefrom. For example, water (such as, chilled water) may be circulated through the absorber section 109 to achieve cooling and simultaneous heat removal.

At block 110, heat is added into a generator section 111 to evaporate a refrigerant from the weak desiccant solution, thereby forming a strong desiccant solution and refrigerant vapor. In some aspects, the weak desiccant solution generated at the absorber section 109 may be directed to the block 110. In some aspects, the strong desiccant solution may be pumped to the block 106 of the absorber section 109. At block 112, the refrigerant vapor is directed to enter a generator section to form refrigerant vapor jets/microjets. In some embodiments, the second unit may include a perforated plate through which the refrigerant vapor is directed. In some embodiments, the refrigerant vapor is directed to enter the second unit based off a pressure differential or elevation difference. At block 114, the refrigerant vapor jets impinge on a cold surface, thereby allowing condensation of the refrigerant vapor jets in a condenser section 115. In some aspects, the surface cooling may be achieved by, for example, but not limited to, supplying cooling water along the surface to be cooled, or thermoelectric cooling. At block 116, condensed refrigerant (also referred to as refrigerant condensate) is collected for further use, such as by a tank, container, bag, or the like. In some aspects, the refrigerant condensate, or liquid refrigerant, may be supplied to the block 102 of the evaporator section 101. As such, the products obtained from the operation of the system 100 may be reused within the system 100, thereby eliminating any wastage of desiccant solutions and refrigerant.

Figure 2:
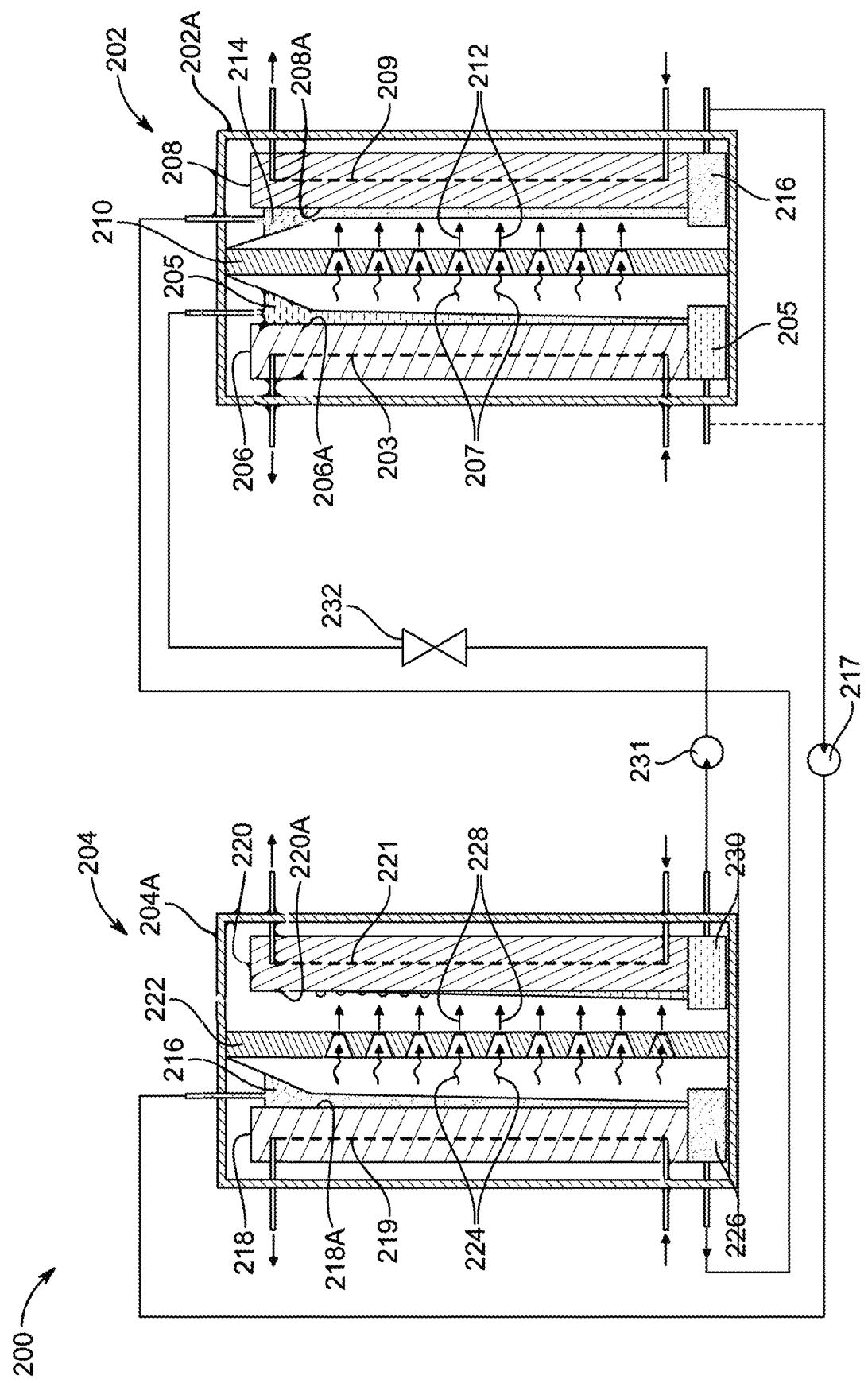
FIG. 2 is schematic diagram of the absorption chiller refrigerator system, according to certain embodiments.

FIG. 2 illustrates a schematic diagram of an absorption chiller refrigerator system 200 (hereinafter referred to as "the system 200"), according to another embodiment of the present disclosure. The system 200 includes an evaporator-absorber section 202 and a generator-condenser section 204 disposed together within a housing (not shown). In a preferred embodiment, the evaporator-absorber section 202 is configured as a single unit to reduce a footprint of the system 200. The evaporator-absorber section 202 includes an evaporator section 202A having an evaporator 206 and an absorber 208. In some embodiments, the evaporator 206 and absorber 208 are disposed together within a second housing that separates the evaporator-absorber section 202 from the generator-condenser section 204. In some embodiments, the second housing is substantially rectangular and seals the components of the evaporator-absorber section 202 from an external atmosphere. The evaporator 206 and the absorber 208 are disposed together within the evaporator section 202A as illustrated in FIG. 2. In some embodiments, the closest inner walls of the evaporator 206 and the absorber 208 are separated by a distance of between 150 millimeters (mm) and 1000 mm, preferably 200 mm to 900 mm, preferably 300 mm to 800 mm, preferably 400 mm to 700 mm, or 500 mm. Particularly, the evaporator 206 and the absorber 208 are disposed in a spaced apart configuration within the evaporator section 202A, such that a perforated plate 210 is disposed therebetween. In some embodiments, the evaporator 206 and the absorber 208 are configured to stand upright in the evaporator-absorber section 202 with parallel axes respective to one another. In some embodiments, the perforated plate 210 contains between 8 perforations and 100 perforations, preferably between 10 to 90 perforations, preferably between 20 and 80 perforations, preferably 30 and 70 perforations, preferably between 40 and 60 perforations 50 perforations. In some embodiments, the perforations in the perforated plate 210 have a circular shape and range in diameter from 1 millimeter (mm) to 50 mm, preferably 5 mm to 45 mm, preferably 10 mm to 40 mm, preferably 15 mm to 35 mm, preferably 20 mm to 30 mm, or 25 mm. In some embodiments, the perforations in the perforated plate 210 have a rectangular shape and range in surface area from 100 $mm^2$ to 1000 $mm^2$, preferably 200 $mm^2$ to 900 $mm^2$, preferably 300 $mm^2$ to 800 $mm^2$, preferably 400 $mm^2$ to 700 $mm^2$, or 500 $mm^2$. In some embodiments, the perforated plate 210 is fabricated of metal, plastic, ceramic, polymers, or a combination of the like. As such, the perforated plate 210 separates the evaporator 206 and the absorber 208 within the evaporator section 202A. In some embodiments, the perforated plate 210 is separated from each of the inner walls of evaporator 206 and absorber 208 by between 75 millimeters (mm) and 500 mm, preferably 100 mm to 400 mm, preferably 150 mm to 350 mm, preferably 200 mm to 300 mm, or 250 mm. In a preferred embodiment, the perforations in the perforated plate 210 are cone-shaped passages, as depicted in FIG. 2. The cone-shaped passages can be described as having a circular base attached to a curved face that wraps around the base and narrows to an apex point. In some embodiments, the apex point is removed to form two parallel planes defined by the upper and lower edge of the cone-shaped passages on each side of the perforated plate 210 instead of a singular apex point, where the apex is removed at about 2% to 10% of the height of the cone from the apex point, preferably 3% to 9%, preferably 4% to 8%, preferably 5% to 7%, or 6%. In some embodiments, the upper edge of the cone-shaped passage closer to the inner wall of the evaporator 206 in the perforated plate 210 is 1.1 to 1.7 times greater in length than the lower plane of the cone-shaped passage closer to the inner wall of the absorber 208 in the perforated plate 210, preferably 1.2 to 1.6 times greater, preferably 1.3 to 1.5 times greater, or 1.4 times greater. In some embodiments, the passages have an elongated shape, a cylindrical shape, or any other shape.

In some embodiments, the evaporator 206 may define a first heat transfer surface 206A and may include a heating unit 203 configured to heat the first heat transfer surface 206A. The heating unit 203, for example, may be embodied as, but not limited to, an electrical heater, a solar heater, resistive heating wires, resistive heating coils, visible or infrared heater or a hot water heat exchanger (that uses circulation of heated water). In some other embodiments, the evaporator 206 may be embodied as an electrical heater. In some embodiments, the evaporator/electrical heater 206 requires a power of 1000 W/hour to 7000 W/hour, preferably 2000 W/hour to 6000 W/hour, preferably 3000 W/hour to 5000 W/hour, or 4000 W/hour.

The absorber 208 defines a second heat transfer surface 208A and may include a cooling unit 209 configured to cool the second heat transfer surface 208A. The cooling unit 209, for example, may be embodied as, but not limited to, a cooling water heat exchanger (that uses circulation of chilled water) or a thermoelectric cooling unit. In some embodiments, the cooling unit 209 requires a power of 1000 W/hour to 7000 W/hour, preferably 2000 W/hour to 6000 W/hour, preferably 3000 W/hour to 5000 W/hour, or 4000 W/hour. In other embodiments, the cooling unit 209 uses other refrigerants to cool heat transfer surface 208A, such as hydrofluorocarbons, carbon dioxide, ammonia, or the like. In some embodiments, the second heat transfer surface 208A includes channels or recesses that direct the flow of condensed material to a tank (not shown) at the bottom of the evaporator 206. In some embodiments, the second heat transfer surface 208A contains between 1 and 20 channels, preferably 2 to 18 channels, preferably 4 to 16 channels, preferably 6 to 14 channels, preferably 8 to 12 channels, or 10 channels.

In operation, at the evaporator-absorber section 202, a first refrigerant 205 is allowed to flow along the first heat transfer surface 206A of the evaporator 206 in a vertical manner as may be seen in FIG. 2. In some embodiments, the refrigerant or absorbent is distributed over the first heat transfer surface 206A to evaporate a thin layer of material ranging from 1 mm to 10 mm, preferably 2 mm to 9 mm, preferably 3 mm to 8 mm, preferably 4 mm to 7 mm, or 5 mm. In some embodiments, the first heat transfer surface 206A acts as a thin film evaporator which includes a rotor/wiper encased in a cylindrical heating jacket to effectively evaporate the thin layer of material. In some embodiments, the thin film evaporator operates at temperatures between 10° C. and 200° C., preferably between 10° C. and 200° C., preferably between 20° C. and 180° C., preferably between 40° C. and 160° C., preferably between 60° C. and 140° C., preferably between 80° C. and 120° C., or 100° C. In some embodiments, the first refrigerant 205 is a hydrofluorocarbon, ammonia, water, carbon dioxide, hydrocarbons, or the like. In some embodiments, the first refrigerant 205 enters the evaporator 206 through a funnel-like tube that is welded, screwed, or otherwise fixedly attached to the evaporator 206. In some embodiments, the funnel-like tube suspends 10 mm to 100 mm above a top surface of the evaporator 206 so as to allow easier entry of the first refrigerant into the evaporator 206, preferably 10 mm to 90 mm, preferably 20 mm to 80 mm, preferably 30 mm to 70 mm, preferably 40 mm to 60 mm, or 50 mm. In some embodiments, the funnel-like tube is fabricated of metal or plastic. The first refrigerant 205 absorbs heat from the first heat transfer surface 206A during the flow. As such, the first refrigerant 205 is evaporated by the evaporator 206 within the evaporator-absorber section 202 to form a first refrigerant vapor 207. In some embodiments, the first heat transfer surface 206A may be heated until a temperature at least equal to a boiling point of the first refrigerant 205 to enhance vaporization process. In some embodiments, this heated temperature ranges from 5° C. to 75° C., preferably 10° C. to 70° C., preferably 20° C. to 60° C., preferably 30° C. to 50° C., or 40° C. Although the description herein mentions the term "refrigerant", it should be understood that other working fluid known to a person skilled in the art may be used. The non-vaporized portion of the first refrigerant 205 is collected in a tank at a bottom of the evaporator 206. In some embodiments, the first refrigerant 205 is collected with a container, bag, or the like. In some embodiments, the tank has a volume of between 5 liters (L) and 50 L, preferably 10 L to 45 L, preferably 15 L to 40 L, preferably 20 L to 35 L, preferably 25 L to 30 L, or 27.5 L. In some embodiments, the first refrigerant 205 may recirculated through the evaporator 206 during a subsequent cycle. In some embodiments, the first refrigerant 205 is recycled back to the evaporator section 202A between 5 and 50 times without need for disposal, preferably 10 to 45 times, preferably 15 to 40 times, preferably 20 to 35 times, preferably 25 to 30 times, or 27 times. In some embodiments, the evaporator 206 is heated by circulated heated water, preferably in a temperature range from 10° C. to 100° C., preferably 20° C. to 90° C., preferably 30° C. to 80° C., preferably 40° C. to 70° C., preferably 50° C. to 60° C., or 55° C. In some embodiments, the circulated heated water is recycled first refrigerant 205. In some embodiments, the absorber 208 is cooled by circulated chilled water or thermoelectric cooling, preferably in a temperature range from 0° C. to 25° C., preferably 5° C. to 20° C., preferably 10° C. to 20° C., preferably 12.5° C. to 17.5° C., or 15° C. In some embodiments, the thermoelectric cooler is a Peltier cooler. In some embodiments, the circulated chilled water is recycled first refrigerant 205.

In arrangement, the perforated plate 210 may be disposed in the vicinity of the evaporator 206. Due to such disposal, a length defined in the evaporator-absorber section 202 between the evaporator 206 and the perforated plate 210 may be minimum, ranging between 10 mm and 200 mm, preferably 25 mm and 175 mm, preferably 50 mm and 150 mm, preferably 75 mm and 125 mm, or 100 mm. Accumulation of the first refrigerant vapor 207 in such small volume aids movement of the first refrigerant vapor 207 through the perforations in the perforated plate 210. As mentioned earlier, the perforations may be embodied as cone-shaped passages. In some embodiments, the perforated plate 210 has a thickness between the planes ranging from 5 mm and 50 mm, preferably 10 mm and 45 mm, preferably 15 mm and 40 mm, preferably 20 mm and 35 mm, or 25 mm thick. The perforated plate 210 is disposed in a manner such that a wide end of the cone-shaped passages face the evaporator 206 and a narrow end of the cone-shaped passages face the absorber 208. Owing to such arrangement, movement of the first refrigerant vapor 207 through the cone-shaped passages results in increase of speed of the first refrigerant vapor 207, thereby forming first refrigerant vapor jets 212. In some embodiments, the pressure differential across the perforated plate 210 ranges from 10 psi to 500 psi, preferably 50 psi to 450 psi, preferably 100 psi to 400 psi, preferably 150 psi to 350 psi, preferably 200 psi to 300 psi, or 250 psi.

At the absorber 208, an absorbent mixture 214 is allowed to flow along the second heat transfer surface 208A. In some embodiments, the refrigerant or absorbent is distributed over the second heat transfer surface 208A to evaporate a thin layer of material ranging from 1 mm to 10 mm, preferably 2 mm to 9 mm, preferably 3 mm to 8 mm, preferably 4 mm to 7 mm, or 5 mm. In some embodiments, the second heat transfer surface 208A acts as a thin film evaporator which includes a rotor/wiper encased in a cylindrical heating jacket to effectively evaporate the thin layer of material. In some embodiments, the thin film evaporator operates at temperatures between 10° C. and 200° C., preferably between 10° C. and 200° C., preferably between 20° C. and 180° C., preferably between 40° C. and 160° C., preferably between 60° C. and 140° C., preferably between 80° C. and 120° C., or 100° C. In some embodiments, the absorbent mixture 214 contains high amounts of silica gel, activated charcoal, calcium chloride, charcoal sulfate, activated alumina, clay, or the like, upwards of between 50 weight % (wt. %) and 95 wt. % of the absorbent mixture 214, preferably 55 wt. % to 90 wt. %, preferably 60 wt. % to 85 wt. %, preferably 65 wt. % to 80 wt. %, preferably 70 wt. % to 75 wt. %, or 72.5 wt. %. In some embodiments, the absorbent mixture 214 enters the absorber 208 through a funnel-like tube that is welded, screwed, or otherwise fixedly attached to the absorber 208. In some embodiments, the funnel-like tube suspends 10 mm to 100 mm above a top surface of the absorber 208 so as to allow easier entry of the absorbent mixture 214 into the absorber 208, preferably 10 mm to 90 mm, preferably 20 mm to 80 mm, preferably 30 mm to 70 mm, preferably 40 mm to 60 mm, or 50 mm. In some embodiments, the funnel-like tube is fabricated of metal or plastic. The first refrigerant vapor jets 212 impinge on the absorbent mixture 214 to form an intermediary product referred to as a first desiccant mixture. Since the first desiccant mixture is simultaneously cooled by the second heat transfer surface 208A, a capacity of the first desiccant mixture to absorb vapor increases. As such, the first desiccant mixture absorbs more vapor to form a vapor absorbed desiccant mixture 216 (alternatively referred to as the weak desiccant mixture 216). Therefore, due to the impingement of the first refrigerant vapor jets 212 on the absorbent mixture 214, high absorption rates may be achieved. Additionally, any leakage of air in the evaporator-absorber section 202 may be mitigated by the use of the impingement of the first refrigerant vapor jets 212. In some embodiments, the weak desiccant mixture 216 is collected in a tank at a bottom of the absorber 208. In some embodiments, the weak desiccant mixture 216 is collected with a container, bag, or the like. In some embodiments, the tank has a volume of between 5 liters (L) and 50 L, preferably 10 L to 45 L, preferably 15 L to 40 L, preferably 20 L to 35 L, preferably 25 L to 30 L, or 27.5 L. In some embodiments, the weak desiccant mixture 216 may be removed from the evaporator-absorber section 202. Since the first refrigerant vapor 207 passes through all the perforations, multiple parallel refrigerant vapor jets 212 impinge on the absorbent mixture 214, ranging from 5 to 50 vapor jets 212, preferably 10 to 45 jets, preferably 15 to 40 jets, preferably 20 to 35 jets, preferably 25 to 30 jets, or 27 jets. In such scenario, all the vapors may not be absorbed by the first desiccant mixture. In some embodiments, unabsorbed refrigerant vapor from the first refrigerant vapor jets 212 may be supplied to the evaporator 206. In some embodiments, such unabsorbed refrigerant vapor may be cooled and condensed to form liquid refrigerant before being supplied to the evaporator 206.

In a preferred embodiment, the generator-condenser section 204 includes a generator section 204A having a generator 218 and a condenser 220. The generator-condenser section 204 is configured as a single unit to reduce the footprint of the system 200. The generator 218 and the condenser 220 are disposed together within the generator section 204A, as illustrated in FIG. 2. In some embodiments, the generator 218 and condenser 220 are disposed together within a third housing that separates the generator-condenser section 204 from the evaporator-absorber section 202. In some embodiments, the third housing is substantially rectangular and seals the components of the generator-condenser section 204 from an external atmosphere. In some embodiments, the closest inner walls of the generator 218 and the condenser 220 are separated by a length of between 150 millimeters (mm) and 1000 mm, preferably 200 mm to 900 mm, preferably 300 mm to 800 mm, preferably 400 mm to 700 mm, or 500 mm. Particularly, the generator 218 and the condenser 220 are disposed in a spaced apart configuration within the generator section 204A, such that a perforated plate 222 is disposed therebetween. In some embodiments, the generator 218 and the condenser 220 are configured to stand upright in the generator-condenser section 204 with parallel axes respective to one another. In some embodiments, the perforated plate 222 contains between 8 perforations and 100 perforations, preferably between 10 to 90 perforations, preferably between 20 and 80 perforations, preferably 30 and 70 perforations, preferably between 40 and 60 perforations 50 perforations. In some embodiments, the perforations in the perforated plate 222 have a circular shape and range in diameter from 1 millimeter (mm) to 50 mm, preferably 5 mm to 45 mm, preferably 10 mm to 40 mm, preferably 15 mm to 35 mm, preferably 20 mm to 30 mm, or 25 mm. In some embodiments, the perforations in the perforated plate 222 have a rectangular shape and range in surface area from 100 mm$^2$ to 1000 mm$^2$, preferably 200 mm$^2$ to 900 mm$^2$, preferably 300 mm$^2$ to 800 mm$^2$, preferably 400 mm$^2$ to 700 mm$^2$, or 500 mm$^2$. In some embodiments, the perforated plate 222 is fabricated of metal, plastic, ceramic, polymers, or a combination of the like. In some embodiments, the perforated plate 222 is separated from each of the inner walls of the generator 218 and the condenser 220 by between 75 millimeters (mm) and 500 mm, preferably 100 mm to 400 mm, preferably 150 mm to 350 mm, preferably 200 mm to 300 mm, or 250 mm. As such, the perforated plate 222 separates the generator 218 and the condenser 220 within the generator section 204A, as depicted in FIG. 2. The perforations in the perforated plate 222 are cone-shaped passages. In some embodiments, the apex point is chopped off to form two parallel planes defined by the upper and lower edge of the cone-shaped passages on each side of the perforated plate 222 instead of a singular apex point, where the apex is chopped off at about 2% to 10% of the height of the cone, preferably 3% to 9%, preferably 4% to 8%, preferably 5% to 7%, or 6%. In some embodiments, the upper edge of the cone-shaped passage closer to the inner wall of the generator 218 in the perforated plate 222 is 1.1 to 1.7 times greater in length than the lower plane of the cone-shaped passage closer to the inner wall of the condenser 220 in the perforated plate 222, preferably 1.2 to 1.6 times greater, preferably 1.3 to 1.5 times greater, or 1.4 times greater. In some embodiments, the absorbent mixture 214 is recycled back to the generator section 204A between 5 and 30 times, preferably 10 and 25 times, preferably 15 times.

In some embodiments, the generator 218 defines a first heat transfer surface 218A and may include a heating unit 219 configured to heat the first heat transfer surface 218A. The heating unit 219, for example, may be embodied as, but not limited to, an electrical heater, a solar heater, visible or infrared heater or a hot water heat exchanger (that uses circulation of heated water). As such, a second refrigerant 230 is evaporated by the generator 218 within the generator-absorber section 204. In some embodiments, the generator 218 may be embodied as an electrical heater. In some embodiments, the generator/electrical heater 206 requires a power of 1000 W/hour to 7000 W/hour, preferably 2000 W/hour to 6000 W/hour, preferably 3000 W/hour to 5000 W/hour, or 4000 W/hour. The condenser 220 defines a second heat transfer surface 220A and may include a cooling unit 221 configured to cool the second heat transfer surface 220A. The cooling unit 209, for example, may be embodied as, but not limited to, a cooling water heat exchanger (that uses circulation of chilled water) or a thermoelectric cooling unit. In some embodiments, the cooling unit 221 requires a power of 1000 W/hour to 7000 W/hour, preferably 2000 W/hour to 6000 W/hour, preferably 3000 W/hour to 5000 W/hour, or 4000 W/hour. In other embodiments, the cooling unit 221 uses other refrigerants to cool heat transfer surface 208A, such as hydrofluorocarbons, carbon dioxide, ammonia, or the like. In some embodiments, the first heat transfer surface 218A includes channels or recesses that direct the flow of condensed material to a tank (not shown) at the bottom of the generator 218. In some embodiments, the first heat transfer surface 218A contains between 1 and 20 channels, preferably 2 to 18 channels, preferably 4 to 16 channels, preferably 6 to 14 channels, preferably 8 to 12 channels, or 10 channels. In some embodiments, a second desiccant mixture is cooled by a cold surface of the condenser 220 and a condensed refrigerant that is formed from the cooling of the second desiccant mixture is removed from the generator section 204A.

In operation, at the generator-condenser section 204, the weak desiccant mixture 216 (rich in vapor) is received from the absorber 208. In some embodiments, a second pump 217 may be used to pump the weak desiccant mixture 216 from the tank of the absorber 208 to the generator 218. In some embodiments, the second pump 217 can send between 1 liter/minute (L/min) and 20 L/min of the weak desiccant mixture 216 to the generator 218 from the absorber 208, preferably between 2 L/min and 18 L/min, preferably between 4 L/min and 16 L/min, preferably between 6 L/min and 14 L/min, preferably between 8 L/min and 12 L/min, or 10 L/min. In some embodiments, the first refrigerant 205 from the tank of the evaporator 206 may be selectively mixed with the weak desiccant mixture 216 before supplying it to the generator 218. Such mixing helps increase the refrigerant content in the weak desiccant mixture 216. Further, the weak desiccant solution 216 is allowed to flow along the first heat transfer surface 218A of the generator 218. In some embodiments, the weak desiccant mixture 216 is distributed over the first heat transfer surface 218A to evaporate a thin layer of material ranging from 1 mm to 10 mm, preferably 2 mm to 9 mm, preferably 3 mm to 8 mm, preferably 4 mm to 7 mm, or 5 mm. In some embodiments, the first heat transfer surface 218A acts as a thin film evaporator which includes a rotor/wiper encased in a cylindrical heating jacket to effectively evaporate the thin layer of material. In some embodiments, the thin film evaporator operates at temperatures between 10° C. and 200° C., preferably between 10° C. and 200° C., preferably between 20° C. and 180° C., preferably between 40° C. and 160° C., preferably between 60° C. and 140° C., preferably between 80° C. and 120° C., or 100° C. In some embodiments, the weak desiccant mixture 216 contains low amounts of desiccants such as silica gel, activated charcoal, calcium chloride, charcoal sulfate, activated alumina, clay, or the like, ranging between 5 weight % (wt. %) and 40 wt. % of the weak desiccant mixture 216, preferably 10 wt. % to 35 wt. %, preferably 15 wt. % to 30 wt. %, preferably 20 wt. % to 25 wt. %, or 22.5 wt. %. In some embodiments, the weak desiccant mixture 216 enters the generator 218 through a funnel-like tube that is welded, screwed, or otherwise fixedly attached to the generator 218. In some embodiments, the funnel-like tube suspends 10 mm to 100 mm above a top surface of the generator 218 so as to allow easier entry of the weak desiccant mixture 216 into the generator 218, preferably 10 mm to 90 mm, preferably 20 mm to 80 mm, preferably 30 mm to 70 mm, preferably 40 mm to 60 mm, or 50 mm. In some embodiments, the funnel-like tube is fabricated of metal or plastic. Due to the absorption of heat from the first heat transfer surface 218A, the refrigerant (referred to as 'the second refrigerant 230'' in the present disclosure) in the weak desiccant mixture 216 is evaporated to form a second refrigerant vapor 224 and a second strong desiccant mixture 226 is collected in a tank located at a bottom of the generator 218. In some embodiments, the weak desiccant mixture 216 is collected with a container, bag, or the like. In some embodiments, the tank has a volume of between 5 liters (L) and 50 L, preferably 10 L to 45 L, preferably 15 L to 40 L, preferably 20 L to 35 L, preferably 25 L to 30 L, or 27.5 L. Therefore, addition of heat to the weak desiccant mixture 216 allows evaporation of the second refrigerant 230 by the generator 218 within the generator-condenser section 204 to separate the second refrigerant vapor 224 from the second strong desiccant mixture 226. Often, all the vapor in the weak desiccant mixture 216 may not be evaporated by the first heat transfer surface 218A. In such scenario, a second strong desiccant mixture may be obtained and collected in the tank of the generator 218. To that end, the second strong desiccant mixture 226 may be alternatively referred to as the second strong desiccant mixture. In some embodiments, the second strong desiccant mixture 226 or the second strong desiccant mixture may be supplied to the top of the absorber 208 as shown in FIG. 2. In some embodiments, the second refrigerant vapor 224 is recycled back to the generator section 204A between 5 and 30 times, preferably between 10 and 25 times, or 15 times. In some embodiments, the generator is heated by circulated heated water, preferably in a temperature range from 10° C. to 100° C., preferably 20° C. to 90° C., preferably 30° C. to 80° C., preferably 40° C. to 70° C., preferably 50° C. to 60° C., or 55° C. In some embodiments, the circulated heated water is recycled second refrigerant 224. In some embodiments, the condenser 220 is cooled by circulated chilled water or thermoelectric cooling, preferably in a temperature range from 0° C. to 25° C., preferably 5° C. to 20° C., preferably 10° C. to 20° C., preferably 12.5° C. to 17.5° C., or 15° C. In some embodiments, the thermoelectric cooler is a Peltier cooler. In some embodiments, the circulated chilled water is recycled second refrigerant 224.

In arrangement, the perforated plate 222 may be disposed in the vicinity of the generator 218. Due to such disposal, a distance defined in the generator-condenser section 204 between the generator 218 and the perforated plate 222 may be minimum, ranging between 10 mm and 200 mm, preferably 25 mm and 175 mm, preferably 50 mm and 150 mm, preferably 75 mm and 125 mm, or 100 mm. In some embodiments, the second refrigerant vapor 230 is jetted by the perforated plate 222 in the generator section 204A to form a second desiccant mixture.

Accumulation of the second refrigerant vapor 224 in such small volume aids movement of the second refrigerant vapor 224 through the perforations in the perforated plate 222. As mentioned earlier, the perforations may be embodied as cone-shaped passages. The perforated plate 222 is disposed in a manner such that a wide end of the cone-shaped passages face the generator 218 and a narrow end of the cone-shaped passages face the condenser 220. Owing to such arrangement, movement of the second refrigerant vapor 224 through the cone-shaped passages results in increase of speed of the second refrigerant vapor 224, thereby forming second refrigerant vapor jets 228.

At the condenser 220, the second refrigerant vapor jets 228 impinge on the second heat transfer surface 220A. Since the second heat transfer surface 220A is cooled by the cooling unit 221, the second refrigerant vapor jets 228 are cooled and condensed, thereby resulting in the second refrigerant 230 that is collected in the tank of the condenser 220 as condensate. In some embodiments, the second refrigerant is generated at a rate of between 10 L/hour and 100 L/hour, preferably between 20 L/hour and 90 L/hour, preferably between 30 L/hour and 80 L/hour preferably between 40 L/hour and 70 L/hour preferably between 50 L/hour and 60 L/hour, or 55 L/hour. Due to the impingement of the second refrigerant vapor jets 228 on the second heat transfer surface 220A, high condensation rates may be achieved. Additionally, any leakage of air in the generator-condenser section 204 may be mitigated by the use of the impingement of the second refrigerant vapor jets 228. Due to the speed with which the second refrigerant vapor jets 228 are incident on the second heat transfer surface 220A, all the refrigerant vapors may not be condensed but may get collected in the tank at the bottom of the condenser 220. In some embodiments, the second refrigerant 230 may be supplied to the top of the evaporator 206, with the aid of a first pump 231. In some embodiments, the first pump 231 can send between 1 liter/minute (L/min) and 20 L/min of the second refrigerant 230 to the evaporator 206 from the condenser 220, preferably between 2 L/min and 18 L/min, preferably between 4 L/min and 16 L/min, preferably between 6 L/min and 14 L/min, preferably between 8 L/min and 12 L/min, or 10 L/min In some embodiments, uncondensed refrigerant vapor may be allowed to pass through an expansion valve 232 to allow expansion and cooling of the refrigerant vapor before supplying it to the evaporator 206. In some embodiments, the expansion valve 232 is sized in a range from between 25 mm to 175 mm in length, preferably between 50 mm to 150 mm, preferably between 75 mm and 125 mm, or 100 mm.

To this end, it will be understood that each of the evaporator-absorber section 202 and the generator-condenser section 204 reduces the overall footprint of the system 200. As such, the present disclosure achieves miniaturization of the system 200. Further, the respective heat transfer surfaces of the evaporator-absorber section 202 and the generator-condenser section 204 eliminate the use of tube banks and other similar equipment, thereby further reducing the footprint of the system 200. Additionally, the respective heat transfer surfaces enhance the efficiency of the evaporator 206 and the condenser 220. Studies have indicated that the impingement of the refrigerant vapor exhibits increase in the efficiency of the evaporation process and the condensation process while maintaining a compact design of the evaporator section 202A and the condenser section 204A, respectively.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A liquid chiller and absorption refrigerator system, comprising:
   an evaporator-absorber section and a generator-condenser section disposed together within a housing, wherein
   the evaporator-absorber section comprises an evaporator section with an evaporator and an absorber, wherein the evaporator and the absorber are disposed together within the evaporator-absorber section;
   the evaporator and the absorber are separated by a first perforated plate within the evaporator-absorber section;
   the first perforated plate is spaced apart from both the evaporator and the absorber;
   wherein perforations of the first perforated plate are cone shaped;
   the generator-condenser section comprises a generator section with a generator and a condenser, wherein the generator and the condenser are disposed together within the generator-condenser section;
   the generator and the condenser are separated by a second perforated plate within the generator section;
   the second perforated plate is spaced apart from both the generator and the condenser; and
   the second perforated plate has perforations in the form of cone-shaped passages.

2. The system of claim 1, wherein a first refrigerant is evaporated by the evaporator within the evaporator-absorber section to form a first refrigerant vapor.

3. The system of claim 1, wherein a second refrigerant is evaporated by the generator within the generator-condenser section to form a strong desiccant mixture.

4. The system of claim 2, wherein the perforated plate in the evaporator section is configured to jet the first refrigerant from an evaporator side of the first perforated plate into an absorbent mixture on an absorber side of the first perforated plate to form a vapor absorbed desiccant mixture.

5. The system of claim 3, wherein the second perforated plate is configured to jet the second refrigerant vapor from a generator side of the first perforated plate into the condenser side of the second perforated plate to form a second desiccant mixture.

6. The system of claim 4, wherein the absorber is configured to cool the vapor absorbed desiccant mixture and form a liquid and flow the liquid from the evaporator section.

7. The system of claim 5, wherein the condenser is configured to cool the second desiccant mixture and form a liquid and flow the liquid from the generator section.

8. The system of claim 1, wherein the evaporator is an electrical heater.

9. The system of claim 6, wherein a tank is fixedly attached to the evaporator to collect the liquid.

10. The system of claim 1, wherein the generator is an electrical heater.

11. The system of claim 3, wherein a tank is fixedly attached to the generator to collect a liquid.

12. The system of claim 6, wherein the evaporator is in liquid flow communication with condenser to recycle the weak desiccant mixture from the condenser to the evaporator by a pump.

13. The system of claim 3, wherein the absorber is in liquid flow communication with the generator to recycle the strong desiccant mixture from the absorber to the generator by a pump.

14. The system of claim 2, wherein the evaporator is in liquid flow communication with condenser to recycle the first refrigerant vapor from the condenser to the evaporator by a pump.

15. The system of claim 3, wherein the absorber is in liquid communication with the generator to recycle the second refrigerant from the absorber to the generator by a pump.

16. The system of claim 1, wherein the evaporator is in fluid communication with the absorber through circulated heated water, which heats the evaporator.

17. The system of claim 1, wherein the generator is in fluid communication with the condenser through circulated heated water, which heats the generator.

18. The system of claim 1, wherein the absorber is in fluid communication with the evaporator through circulated chilled water, which cools the absorber.

19. The system of claim 1, wherein the condenser is in fluid communication with the generator through circulated chilled water, which cools the condenser.

* * * * *